(12) United States Patent
Mundt

(10) Patent No.: US 10,016,829 B2
(45) Date of Patent: Jul. 10, 2018

(54) METHOD FOR DRESSING A MULTITHREAD GRINDING WORM

(71) Applicant: Liebherr-Verzahntechnik GmbH, Kempten/Allgaeu (DE)

(72) Inventor: Alois Mundt, Kempten (DE)

(73) Assignee: Liebherr-Verzahntechnik GmbH, Kempten/Allgaeu (DE)

( * ) Notice: Subject to any disclaimer, the term of this patent is extended or adjusted under 35 U.S.C. 154(b) by 193 days.

(21) Appl. No.: 15/207,373

(22) Filed: Jul. 11, 2016

(65) Prior Publication Data

US 2017/0008110 A1 Jan. 12, 2017

(30) Foreign Application Priority Data

Jul. 10, 2015 (DE) .................. 10 2015 008 962

(51) Int. Cl.
| | | |
|---|---|---|
| *B23F 23/12* | (2006.01) | |
| *B23G 1/38* | (2006.01) | |
| *B24B 53/08* | (2006.01) | |

(52) U.S. Cl.
CPC ...... *B23F 23/1231* (2013.01); *B23F 23/1225* (2013.01); *B23G 1/38* (2013.01); *B24B 53/083* (2013.01)

(58) Field of Classification Search
CPC .... B23F 23/1231; B23F 23/1225; B23F 5/02; B23F 19/04; B23G 1/38; B24B 53/083
See application file for complete search history.

(56) References Cited

U.S. PATENT DOCUMENTS

| | | | | |
|---|---|---|---|---|
| 4,289,110 A | | 9/1981 | Junker | |
| 4,993,194 A | * | 2/1991 | Cadisch | B24B 53/075 451/253 |
| 5,339,794 A | * | 8/1994 | Thyssen | B24B 53/085 125/11.04 |
| 5,624,301 A | * | 4/1997 | Lenz | B23F 1/026 451/21 |
| 5,954,568 A | * | 9/1999 | Wirz | B24B 53/075 125/11.01 |
| 6,386,953 B1 | * | 5/2002 | Wirz | B23F 13/00 451/147 |
| 8,147,296 B2 | * | 4/2012 | Lopez | B24B 53/085 125/11.03 |
| 8,323,073 B2 | * | 12/2012 | Vucetic | B23F 1/02 409/66 |
| 2009/0053977 A1 | | 2/2009 | Vucetic et al. | |

FOREIGN PATENT DOCUMENTS

| | | |
|---|---|---|
| DE | 476653 C | 5/1929 |
| DE | 102007040894 A1 | 2/2009 |
| JP | 2010284796 A | 12/2010 |

* cited by examiner

*Primary Examiner* — Dung Van Nguyen
(74) *Attorney, Agent, or Firm* — McCoy Russell LLP

(57) ABSTRACT

The present disclosure relates to a method for dressing a multithread grinding worm, in which a flight of the multithread grinding worm is machined by means of a dressing tool. During machining of the multithread grinding worm, one of several flights of the grinding worm is eliminated, so that the number of flights of the grinding worm is reduced, thereby increasing the service life of the dressing tool and reducing the number of dressing tools to be kept in stock.

17 Claims, 6 Drawing Sheets ical field

METHOD FOR DRESSING A MULTITHREAD GRINDING WORM

CROSS REFERENCE TO RELATED APPLICATION

This application claims priority to German Patent Application No. 10 2015 008 962.5, entitled "Method for Dressing a Multithread Grinding Worm," filed Jul. 10, 2015, the entire contents of which are hereby incorporated by reference in its entirety for all purposes.

TECHNICAL FIELD

The present disclosure relates to a method for dressing a multithread grinding worm.

BACKGROUND AND SUMMARY

Grinding worms are used in particular for hard finishing gear wheels. Here, the profile of the toothing is machined by hobbing the rack-shaped profile of the grinding worm on the workpiece. A particularly economic method for hard finishing gear wheels with the grinding worm is continuous hob grinding, in which several teeth of the workpiece (gear wheel blank) are in engagement with the teeth of a grinding worm.

To produce a tooth flank of the workpiece of the highest quality, it is necessary to process the grinding worm in recurring cycles. In doing so, the contours of the flights of the grinding worm are processed in a dressing and profiling operation, in which the worm geometry and the cutting ability is restored and cloggings by chip, grain and binding residues in the pore spaces of the grinding wheel are removed, so that the desired workpiece can be machined with the grinding worm. In practice, the terms dressing and profiling are used synonymously; in the following description, reference only is made to dressing which also comprises profiling and sharpening.

This dressing operation is repeated in dependence on the degree of wear of the grinding worm. The grinding worm likewise can be reprofiled, when machining of a toothing series has been terminated and new, similar workpieces now are to be machined with the same grinding tool. For this purpose, the worm can be adapted to the new toothing data by a dressing operation.

Typically, a diamond-coated tool is used as dressing tool, as with the same a high manufacturing quality and a low thermal load of the grinding tool can be achieved with an optimum geometrical design. Depending on the task, various dressing tools are available for machining different contour regions of the grinding tools. Beside form rolls which dress only small partial surfaces on the grinding tool, dressing wheels and profile rolls are used, which are able to dress the flanks as well as the head and foot regions on the grinding worm at the same time.

When dressing grinding worms, the flanks of the individual flights are profiled by means of rotating dressing tools. Due to the dressing process, the desired tooth flank profile of the grinding worm is transferred from the dressing tool to the grinding worm or produced by a targeted movement of the dressing tool relative to the grinding worm. When designing the dressing tools, gear wheel parameters such as profile cambers, head reliefs, and foot reliefs frequently are mapped already in the dressing tool and transferred to the grinding worm due to the dressing process. This leads to the fact that these tools frequently are bound to a particular toothing, and other toothings hence can be machined only to a limited extent. The dressing tools usually consist of a steel base body which in the region of the tooth profile is coated with diamond grains. The head region of the dresser frequently is reinforced with diamond needles, as during dressing this region is subject to particularly strong wear and especially with a small modulus only has a small radius.

In the fabrication of small-modulus gear wheels, the service life of the dressing tools is reduced distinctly due to their small tooth width above all in the head region of the dresser. Another influencing variable in the dressing operation of the grinding worm by a dressing tool is the batch size of the gear wheel to be manufactured. The smaller the batch size, e.g. the total number of gear wheels to be fabricated, the more ineffective is the procurement of a dressing tool adapted especially for a special toothing.

It therefore is the object underlying the present disclosure to create a method in which a service life of a dressing tool for small moduli is increased during hob grinding. At the same time, it will nevertheless be possible with the method even with not exactly fitting dressing tools (e.g. too large modulus) to particularly economically machine various tooth flank geometries on the grinding worm even with small batch sizes or to at all provide for machining this toothing with this grinding tool. The possibility of at all machining a small series of toothings sometimes has distinctly more weight than the requirement to also perform this particularly economically, for which purpose an expensive dressing tool with long delivery time must then be procured in the first place, before machining can be started at all.

These objects are solved by the methods for dressing a multithread grinding worm described herein. For example, these objects are solved by a method for dressing a multithread grinding worm having a plurality of flights, comprising machining a flight of the grinding worm with a dressing tool, wherein during machining at least one of the plurality of flights of the grinding worm is set back in terms of tooth width and/or tooth height with respect to the original flank, so that the number of flights of the grinding worm is reduced.

The grinding tool for this method initially is designed like a multithread, at least double-thread tool. During dressing, one flank of a respectively first flight of the multithread grinding worm now is machined by means of a dressing tool. In a second step, the opposed flank of a second or multiple flight is machined on the tool, depending on how many flights are skipped. The method is characterized in that during machining of the grinding worm at least one of the several flights of the grinding worm is eliminated or reduced, so that the actually effective number of flights of the grinding worm is reduced again.

As used herein, an "opposed" or "opposing" flank to a given flank is a flank which, together with the given flank, forms a flight. For example, the given flank and the opposing flank may be angled away from one another. With regard to first and second flights separated by a tooth, the first flight has first and second flanks, and the second flank is part of the tooth. The second flight also has first and second flanks, and the first flank is also part of the tooth. The opposed or opposing flank of the second flight relative to the first flank of the first flight refers to the flank of the second flight which is not part of the tooth separating the two flights, i.e., the second flank of the second flight. Similarly, in the case of multiple adjacent flights in which each pair of adjacent flights is separated by a tooth, the opposed or opposing flanks of two given flights of the multiple flights are not flanks of any of the teeth separating the two given flights.

When machining workpieces on the other hand, the existence of multiple flights again must be taken into account by the basic design. For example, in a double-thread worm according to the design, the workpiece must be machined with two grinding strokes, as otherwise partial regions or teeth are not machined, which originally would have been machined by the second flight or the second grinding worm flank. Above all because grinding worms dressed by this method machine the workpiece on one flank only, and in addition on various successive teeth.

The multithread grinding worm contains at least two flights, wherein the different flights are separated from each other by a respective elevation (tooth of the worm). In the method for dressing the grinding worms, at least two adjacent flights which typically extend helically in parallel one beside the other are combined to one flight, in that the element separating the two flights is set back in terms of tooth width and/or tooth height with respect to the original flank. Setting back in this connection means that the element separating the two flights from each other (a tooth of the worm) is removed and/or ground off by means of the dressing tool, so that during machining of the workpiece this tooth no longer is in engagement and does not remove any material from the workpiece. In the extreme case, this tooth is set back to such an extent that nothing is left of the same.

This setting back also can be effected only over a partial region of the worm width, whereby the number of flights of the grinding worm is reduced at least only in a partial region of the grinding worm, e.g. when the worm is not utilized over its entire width or when the grinding tool is divided into a roughing-finishing region. For example, in the roughing region the grinding worm can be processed with a dresser not fitting exactly such that all flights are utilized, but instead only parts of the tooth height are machined. Only in the finishing region, with which the workpiece quality then is produced, the grinding tool then is dressed such that it also produces the requested quality, and then the entire tooth height is machined with skipped flights on the grinding worm.

For the purposes of the present disclosure it can be sufficient when 80% or more of the original height of the element separating the flights to be combined is removed (e.g., when 80%, 90%, or 100% of the original height of the element is removed). The original height is determined proceeding from the tooth base of the flight.

In this method it is advantageous that for dressing it is not absolutely necessary to use a dressing tool adjusted to the tooth gap of the flight, but a universal dresser broader in its construction can be used, whose service life and lifetime is advantageous with respect to the dresser adjusted to the tooth gap. In addition, the use of a universal dresser which is not optimally adjusted to the multithread grinding worm in the fabrication of small-modulus gear wheels leads to the fact that neither the dresser nor the grinding worm must be changed with every change in the gear wheel size or gear wheel geometry of the gear wheel to be fabricated. In particular in the case of small batch sizes this represents a considerable advantage, as here the replacement and the selection of an appropriate dresser and/or a grinding worm have a particularly large influence on the service life. Furthermore, it now no longer is absolutely necessary for each of the gear wheel characteristics to be fabricated to keep in stock a separate dresser. The total number of dressers thus can greatly be reduced.

In contrast to the prior art, not merely the contour of a flank of a flight is machined, but the characteristic of the grinding worm is changed fundamentally by reducing the number of flights of the grinding worm.

According to another advantageous feature of the present disclosure the dressing tool for machining the flight has a tooth width which is greater than the tooth gap width of the flight. Furthermore, it is possible that the dressing tool is pivoted in the worm gap to produce certain modifications on a worm flank and thus becomes broader in its effect and hence the counter flank in the worm gap also is dressed or actually is changed inadmissibly. By setting back this counter flank, the same can be brought out of engagement during machining. In some examples, the tooth width of the dressing tool is greater than 110% of the tooth gap width of the flight, e.g. greater than 125% of the tooth gap width of the flight, or greater than 150% of the tooth gap width of the flight.

The broader design of the dressing tool leads to a longer service life of the dressing tool, as the dressing tool can be designed more stable above all at the tooth head and thus has a greater stiffness or can be reground more often, as more material is available for this purpose. Thus, the dresser in turn can be used for a longer time.

According to another advantageous embodiment of the method according to the present disclosure the dressing tool is applied flush to a flank of the flight and during machining partly or completely removes the corresponding other flank of the flight.

A flight is a helically or spirally extending depression in a substantially cylindrical body, which includes two flanks facing each other and a tooth base connecting these flanks.

According to an embodiment of this method the dressing tool is applied flush to one of the two flanks of a flight, whereby at the same time the corresponding other flank of the flight is partly or completely removed by the dressing tool. This means that the dressing tool or the tooth width of the element of the dressing tool introduced into the flight is broader than the flight of the grinding worm at at least one point (as measured in longitudinal direction of the grinding worm).

In this method it is advantageous that in only one working step one of the two flanks of a flight is dressed and at the same time the elimination of one or more flights of the grinding worm proceeds or is realized.

Preferably, the dressing tool subsequently is applied flush to a flank facing the removed flank in a flight adjacent to the removed flank. Hence, the tooth of the grinding worm which separates the two flights from each other here is removed on its two flanks. Of course, it is however also possible that this tooth already has been removed completely during the dressing operation which follows the first application of the dressing tool. Then, merely the second flank of the now broadened flight is dressed. When the tooth which separates both flights to be connected with each other, however, is not removed completely in a first step, this tooth now is set back from the direction of the tooth flank not removed yet. Hence, a part of the tooth separating the two flights first is removed by the dressing tool on one flank and in a further step the remaining tooth is removed from the direction of the other flank, when the dressing tool machines the adjacent flight which after executing the operation forms a part of an enlarged flight.

This method has the advantage that with only two working steps a right and a left flank of the newly created flight each can be dressed and at the same time one flight is eliminated or set back with respect to its original flank.

According to another advantageous feature of the method, the tooth base of the flight preferably is removed by the dressing tool when machining the flight.

This can be advantageous, as in a specific design of the dressing tool two-flank dressing of the two flanks, which define the new broadened flight, is possible only when removing the tooth base of the flight. The immersion depth of the dressing tool here is deeper than the tooth base of the grinding worm, but during hob grinding the tooth base frequently is not machined as well, so that here only the flanks are used. Accordingly, it is advantageous for the effectiveness of the method when the tooth base can be removed, so that the dresser provides for two-flank dressing.

Furthermore advantageously it is possible that only a partial region of the grinding worm is machined by the method according to the present disclosure for machining the flight.

A partial region is understood to be a portion of a flight which does not extend along the entire length of the grinding worm and in which the machining process according to the present disclosure is carried out.

This is advantageous when less than the complete grinding worm width is required for fabricating, in particular hob grinding, the gear wheel to be fabricated.

In addition, it furthermore is advantageous for the method of the present disclosure when the dressing tool is a double dresser which is able to simultaneously machine the same flank and/or different flanks of one or different flights at different positions. Preferably, the flanks to be machined at the same time are identical to each other in their alignment.

The time required by the multithread grinding worm for dressing thereby is reduced.

The present disclosure will now be explained in detail with reference to drawings described in detail.

DETAILED DESCRIPTION

Figure 1:
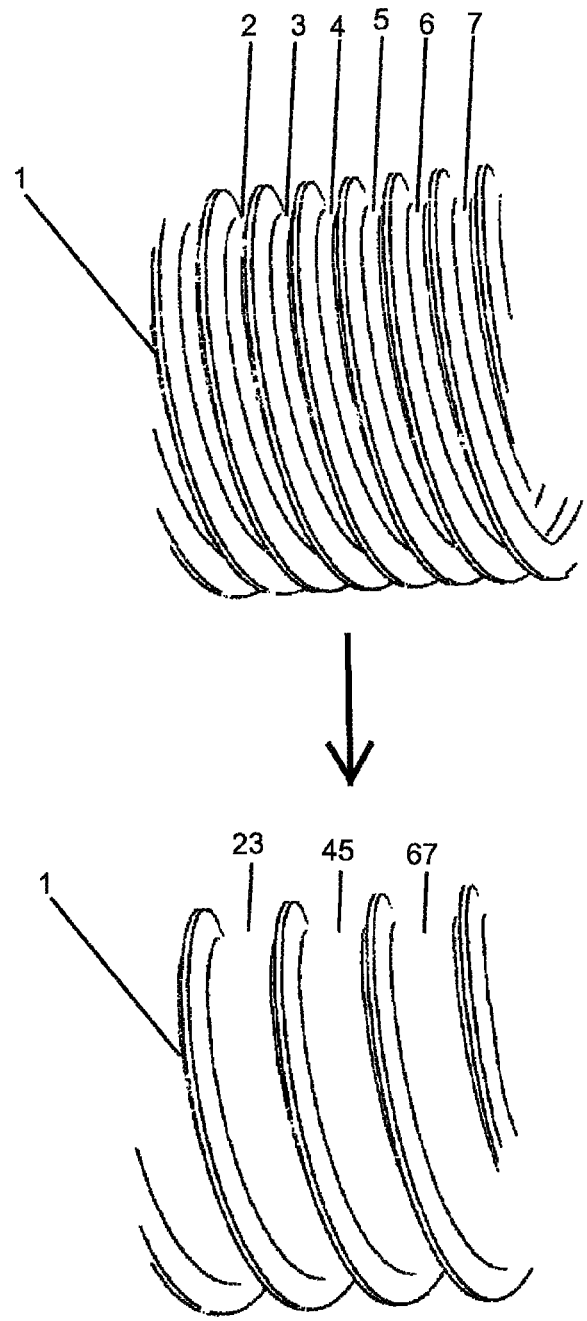
FIG. 1 shows the original condition of a multithread grinding worm and the condition of the multithread grinding worm after machining by the method according to the present disclosure.

The upper part of FIG. 1 shows a multithread grinding worm 1 which has a total of six flights 2, 3, 4, 5, 6, 7. The individual flights 2, 3, 4, 5, 6, 7 are separated from each other by respective teeth arranged between the adjacent flights 2, 3, 4, 5, 6, 7.

After applying the method according to the present disclosure as claimed in claim 1, the number of flights has been reduced from previously six to the value of three. This can clearly be seen in the grinding worm in the lower region of FIG. 1. The flights 2, 3 previously separated from each other now are combined to one common flight 23. The same applies for the previously separated flights 4 and 5, which now likewise form a common flight 45, and the previously separated flights 6 and 7, which now likewise form a common flight 67.

While the upper part of FIG. 1 depicts a grinding worm with six flights, it will be appreciated that the method may be equally applied to any grinding worm having at least two flights.

Figure 2:
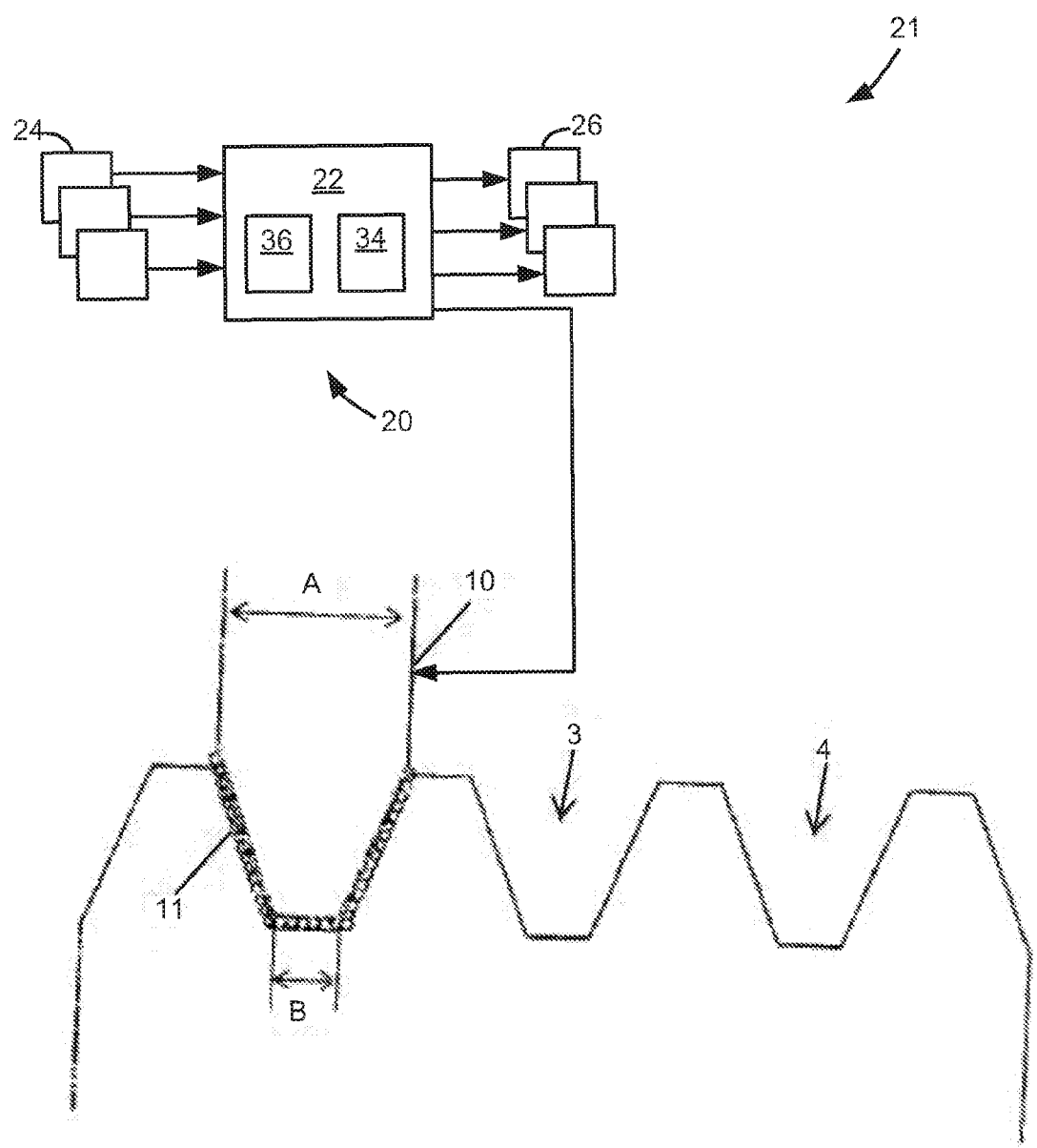
FIG. 2 shows dressing of a multithread grinding worm.

FIG. 2 shows the two-flank dressing of a multithread grinding worm for a dressing tool which is perfectly adjusted to the flight of the grinding worm. The width A of the dressing tool 10 corresponds with the distance between the tooth heads of the two corresponding flanks. In addition, the width B of the dressing tool 10 at its tooth head is adapted to (e.g., substantially equal to) the width of the tooth base of the flight. Typically, the dressing tool 10 has a diamond coating 11 on the regions which contact with the grinding worm during dressing (e.g., the portions of the surface of the dressing tool which contact the flanks and tooth base of a flight of the grinding worm during dressing are coated with the diamond coating).

The machining of the grinding worm by the dressing tool may be performed by a grinding worm dressing apparatus 21 including a control system 20, which is schematically shown in FIG. 2. Control system 20 includes a control unit 22, sensors 24, and actuators 26. Control unit 22 includes a processor 34 and non-transitory memory 36, the non-transitory memory having instructions stored therein for carrying out the various control actions described herein, including control actions associated with the methods shown in FIGS. 6-7 and the dressing actions shown in FIGS. 2-4. The sensors 24 represent the various sensors and/or detection devices which may be used in the context of dressing a grinding worm. Sensors 24 further may include devices (e.g., display devices, joysticks, etc.) which receive input from an operator of the dressing apparatus and send signals to the control unit responsive to the operator input. The actuators 26 may include dressing tool 10, and the machining performed by dressing tool 10 may be controlled by control unit 22 based on instructions stored in non-transitory memory 36. Control unit 22 receives signals from the various sensors 24 and employs the various actuators 26 to adjust operation of the dressing apparatus (e.g., adjust operation of the dressing tool), based on the received signals and the instructions stored in the non-transitory memory 36. In one non-limiting example, an operator may input a desired number of flights to remove from the grinding worm, and/or an extent to which a tooth separating adjacent flights of the grinding worm should be reduced in size, and the dressing tool may be controlled by the control unit accordingly.

Figure 3:
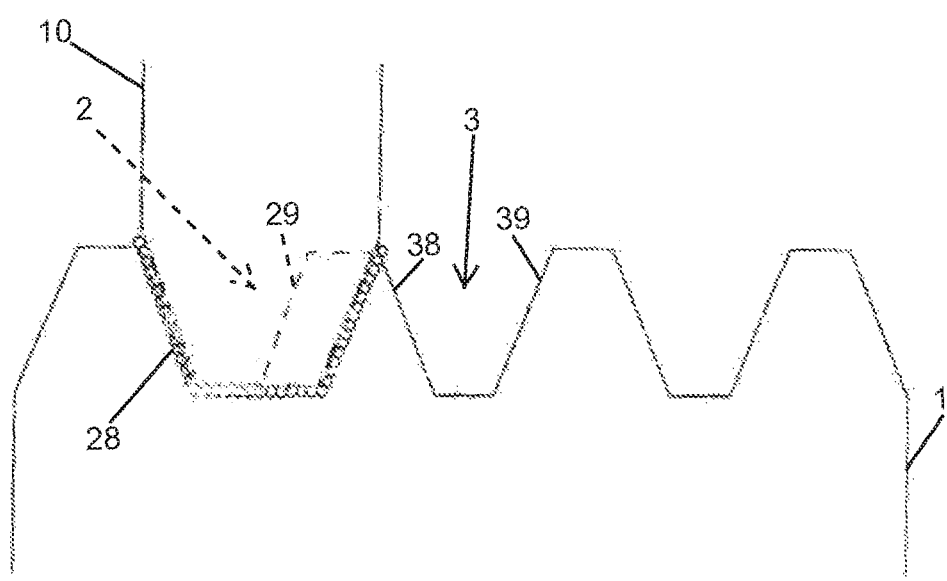
FIG. 3 shows a schematic diagram during execution of the method according to the present disclosure.

FIG. 3 shows a schematic diagram of a dressing tool 10 and a grinding worm 1 during the application of the method according to the present disclosure for dressing a first flight of the grinding worm 1. As shown, one of the flanks of the dressing tool 10 rests flush against a flank 28 of the flight 2, and the tooth which separates the flight 2 from the flight 3 has already been removed in part (dashed representation close to reference numeral 29). For example, as shown, a portion of the tooth which separates the flight 2 from the flight 3, including flank 29 of the tooth, has been removed, while flank 38 of the tooth remains.

In a second step the tooth flank 39 opposite the tooth flank 28 is dressed in the next flight (i.e., flight 3) and the tooth separating the flights 2, 3 is removed or set back (e.g., reduced in size, including the distance between what is now the tooth head and the tooth base being reduced). This is accomplished in that the dressing tool 10 is applied to the flank 39 of the flight 3, whereby the tooth previously connecting the two flights 2, 3 with its two flanks 29 and 38 is eliminated or set back. Here, it is advantageous that a dressing tool 10 not adjusted to the width of the tooth gap in the grinding worm 1 (e.g., the width of the gap between two flanks of a flight of the grinding worm) can be used. For example, the width of the dressing tool at its tooth head may be greater than the width of the tooth base of the flight. This increases the flexibility during selection of the available dressing tools 10, so that a dressing tool 10 adjusted to a particular tooth gap distance is not absolutely necessary. In general, the number of dressing tools to be kept in stock thus can be reduced.

Figure 4:
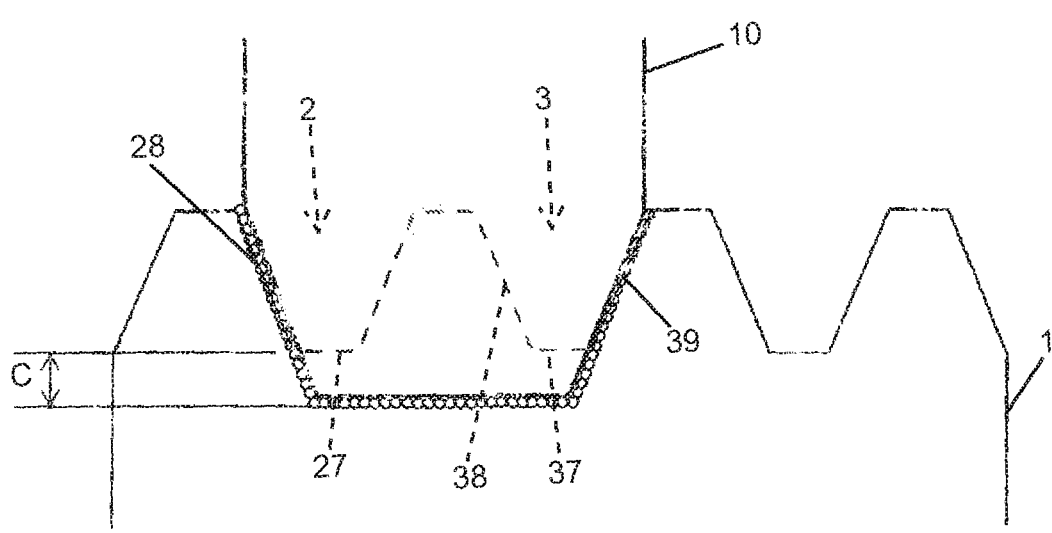
FIG. 4 shows a schematic diagram during execution of the method according to the present disclosure.

FIG. 4 shows a further case of the method according to the present disclosure for dressing a multithread grinding worm 1, in which in one working step both flanks 28, 39 can be dressed with the dressing tool 10. In FIG. 4, the tooth previously separating the two flights which has flanks 29, 38 again is shown in broken lines. In addition, it can be seen that the immersion depth of the dressing tool 10 is so large that the original tooth base 27 of the flight 2 and the original tooth base 37 of the flight 3 has been removed by the amount C. As a result, the depth of the common flight 23 formed by the removal of the tooth previously separating the two flights is greater than the depth of the original flights 2, 3. The removal of the tooth base can easily be possible, as during hob grinding frequently only the flanks of the grinding worm are required and the tooth base of the tooth gaps is not ground as well on the workpiece.

Figure 5A:
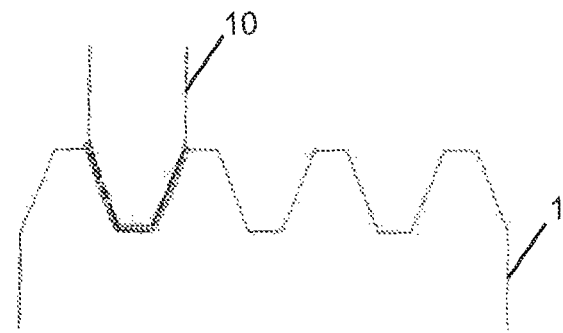
FIG. 5A shows one example of a method known in the prior art for dressing a grinding worm.
Figure 5B:
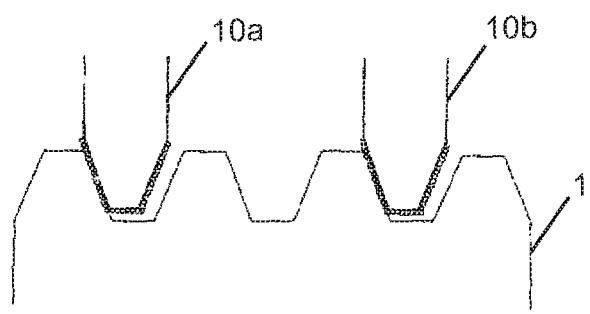
FIG. 5B shows another example of a method known in the prior art for dressing a grinding worm.
Figure 5C:
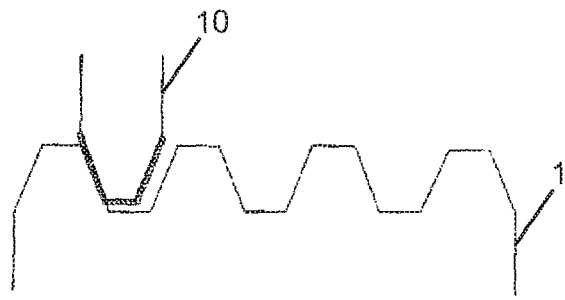
FIG. 5C shows yet another example of a method known in the prior art for dressing a grinding worm.

FIGS. 5A to 5C show various dressing methods according to the prior art.

FIG. 5A shows a dressing tool 10 which fits flush into the tooth gap of the flight of the grinding worm 1. Two-flank dressing of the flight is possible.

FIG. 5B shows a double dresser with its two dressing tools 10a, 10b, wherein each dressing tool dresses one flank of the grinding worm 1. As shown, dressing tool 10a dresses a flank of one flight of the grinding worm while dressing tool 10b dresses a flank of a different flight of the grinding worm. The width of each of dressing tools 10a, 10b is smaller than the tooth gap width of the flights being dressed.

FIG. 5C shows one-flank dressing by a dressing tool 10 whose width is smaller than the tooth gap width of the flight being dressed.

Figure 6:
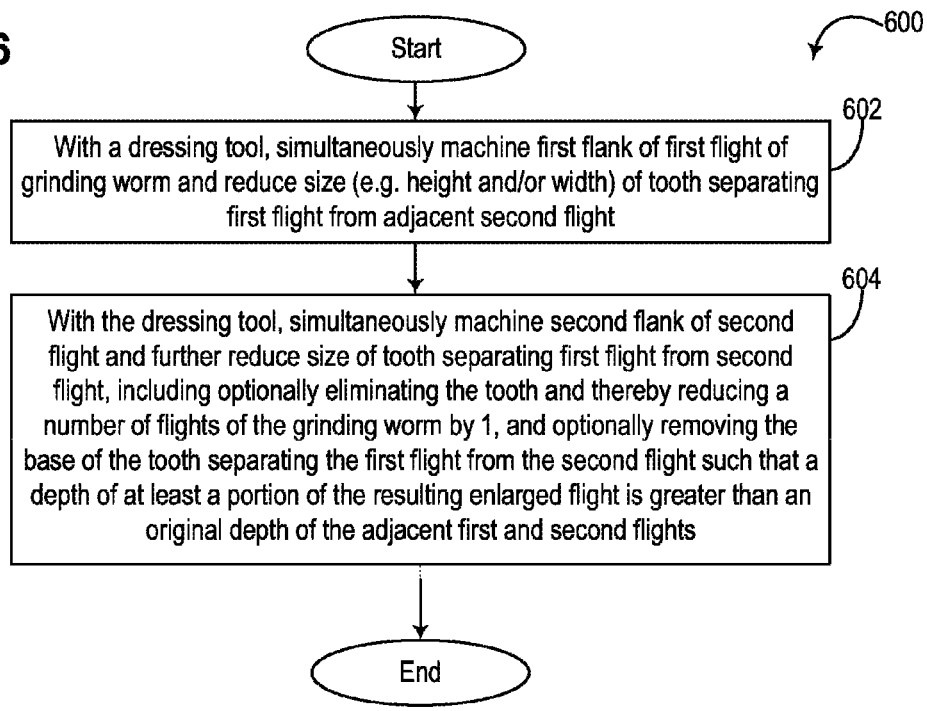
FIG. 6 shows a flow chart of a method for reducing the size of or eliminating a tooth separating first and second flights of a grinding worm via machining with a dressing tool.

FIG. 6 shows a flow chart of a method 600 for reducing the size of or eliminating a tooth separating first and second flights of a grinding worm (e.g., the grinding worm shown in FIGS. 1-4) via machining with a dressing tool (e.g., the dressing tool shown in FIGS. 1-4). In some examples, instructions for carrying out method 600 may be stored in non-transitory memory of a control system, such as non-transitory memory 36 of control system 20 shown in FIG. 2. Further, method 600 may be executed by a processor of the control system (e.g., processor 34 of control system 20 shown in FIG. 2).

At 602, method 600 includes, with a dressing tool, simultaneously machining a first flank of a first flight of grinding worm and reducing the size (e.g. height and/or width) of a tooth separating the first flight from an adjacent second flight.

After 602, method 600 proceeds to 604. At 604, the method includes, with the dressing tool, simultaneously machining a second flank of the second flight and further reducing the size of the tooth separating the first flight from the second flight, including optionally eliminating the tooth and thereby reducing a number of flights of the grinding worm by 1. The method further includes, at 604, optionally removing the base of the tooth separating the first flight from the second flight, such that a depth of at least a portion of the resulting enlarged flight is greater than an original depth of the adjacent first and second flights. After 604, the method returns.

Figure 7:
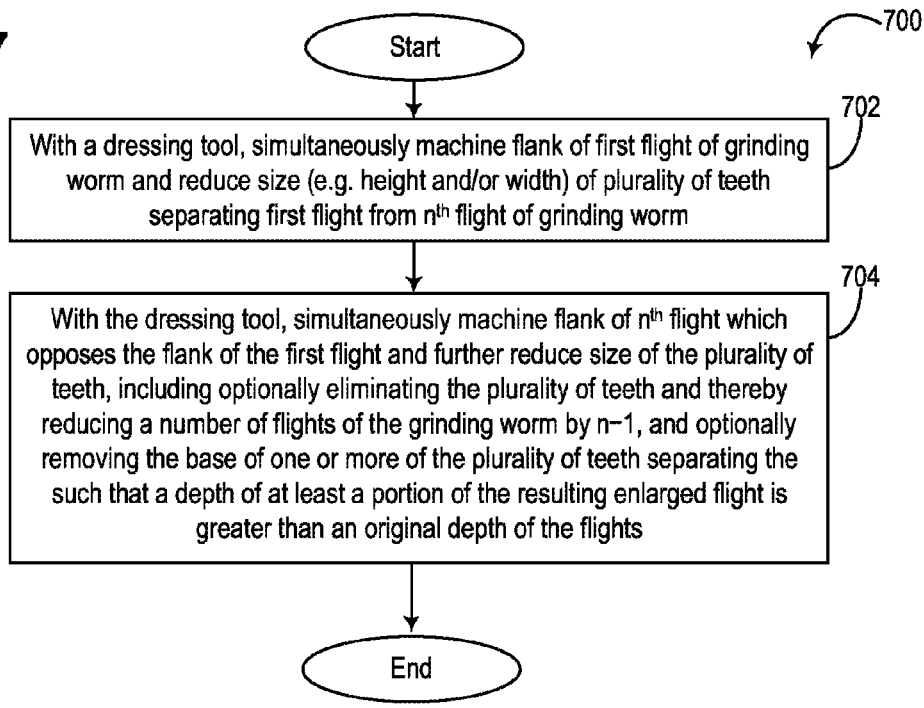
FIG. 7 shows a flow chart of a method for reducing the size of or eliminating a plurality of teeth separating first through $n^{th}$ flights of a grinding worm via machining with a dressing tool.

FIG. 7 shows a flow chart of a method 700 for reducing the size of or eliminating a plurality of teeth separating first through $n^{th}$ flights of a grinding worm (e.g., the grinding worm shown in FIGS. 1-4) via machining with a dressing tool (e.g., the dressing tool shown in FIGS. 1-4). In some examples, instructions for carrying out method 600 may be stored in non-transitory memory of a control system, such as non-transitory memory 36 of control system 20 shown in FIG. 2. Further, method 700 may be executed by a processor of the control system (e.g., processor 34 of control system 20 shown in FIG. 2).

At 702, method 700 includes, with a dressing tool, simultaneously machining a flank of a first flight of a grinding worm and reducing the size (e.g. height and/or width) of a plurality of teeth separating the first flight from an $n^{th}$ flight of the grinding worm. In one non-limiting example, the sizes of a first tooth separating the first flight from a second flight and a second tooth separating the second flight from a third flight are reduced, and the $n^{th}$ flight is the third flight.

At 704, method 700 includes, with the dressing tool, simultaneously machining a flank of the $n^{th}$ flight, which opposes the flank of the first flight, and further reducing the size of the plurality of teeth. This may optionally include eliminating the plurality of teeth and thereby reducing a number of flights of the grinding worm by n−1. For example, in the case where n=3, three flights of the grinding worm are reduced to one enlarged flight via the elimination of the teeth separating the first, second, and third flights. Further, at 704, method 700 may include optionally removing the base of one or more of the plurality of teeth separating the such that a depth of at least a portion of the resulting enlarged flight is greater than an original depth of the flights. In such a case, the immersion depth of the dressing tool during machining may be greater than the original depth of the flights. After 704, method 700 returns.

The invention claimed is:

1. A method for dressing a multithread grinding worm having a plurality of flights, comprising:
   machining a flight of the grinding worm with a dressing tool, wherein during machining at least one of the plurality of flights of the grinding worm is set back in terms of tooth width and/or tooth height with respect to the original flank, so that the number of flights of the grinding worm is reduced.

2. The method according to claim 1, wherein the dressing tool has a tooth width which is greater than a width of a gap between opposing first and second flanks of the flight being machined.

3. The method according to claim 2, wherein the tooth width of the dressing tool is greater than 110% of the width of the gap between the opposing first and second flanks of the flight being machined.

4. The method according to claim 2, wherein the tooth width of the dressing tool is greater than 125% of the width of the gap between the opposing first and second flanks of the flight being machined.

5. The method according to claim 2, the tooth width of the dressing tool is greater than 150% of the width of the gap between the opposing first and second flanks of the flight being machined.

6. The method according to claim 1, wherein the dressing tool is applied flush to a flank of the flight being machined and during machining partly or completely removes the corresponding other flank of the flight being machined.

7. The method according to claim 6, wherein the dressing tool subsequently is applied flush to a flank facing the removed flank in a flight adjacent to the removed flank.

8. The method according to claim 1, wherein during machining of the flight, a tooth base of the flight is removed by the dressing tool.

9. The method according to claim 1, wherein during machining of the flight, only a partial region of the grinding worm is machined.

10. The method according to claim 1, wherein the dressing tool is a double dresser, the method further comprising machining two different flanks of the grinding worm at one time with the double dresser.

11. The method according to claim 1, wherein during machining of the flight, the dressing tool is pivoted on a worm flank in a worm gap, so that the counter flank also is dressed in the worm gap.

12. A method, comprising:
with a dressing tool, simultaneously machining a first flank of first flight of a multi-thread grinding worm and reducing the size of a tooth separating the first flight from an adjacent second flight, wherein a second flank of the first flight opposing the first flank is also a first flank of the tooth and wherein a first flank of the second flight is also a second flank of the tooth;
subsequently, with the dressing tool, simultaneously machining a second flank of the second flight opposing the first flank of the second flight and further reducing the size of the tooth.

13. The method of claim 12, wherein by way of the machining of the first flank of the first flight and the second flank of the second flight, the tooth separating the first flight from the second flight is eliminated and a number of flights of the grinding worm is reduced by 1.

14. The method of claim 13, wherein an immersion depth of the dressing tool during the machining is greater than a height of the tooth separating the first flight from the second flight such that a depth of an enlarged flight formed by the elimination of the tooth is greater than a depth of the first and second flights before the machining.

15. The method of claim 12, wherein by way of the machining of the flank of the first flight and the opposing flank of the $n^{th}$ flight, the plurality of teeth separating the first flight from the $n^{th}$ flight is eliminated and a number of flights of the grinding worm is reduced by n−1.

16. The method of claim 15, wherein an immersion depth of the dressing tool during the machining is greater than a height of the one or more of the plurality of teeth such that a depth of an enlarged flight formed by the elimination of the plurality of teeth is greater than a depth of the first through $n^{th}$ flights before the machining.

17. A method, comprising:
with a dressing tool, simultaneously machining a flank of a first flight of a multi-thread grinding worm and reducing the size of a plurality of teeth, each tooth of the plurality of teeth separating two adjacent flights of the grinding worm, and the plurality of teeth separating the first flight from a $n^{th}$ flight of the grinding worm;
subsequently, with the dressing tool, simultaneously machining a flank of the $n^{th}$ flight which opposes the flank of the first flight and further reducing the size of the plurality of teeth separating the first flight from the $n^{th}$ flight.

* * * * *